United States Patent
Rieger

[15] 3,659,698
[45] May 2, 1972

[54] CHAIN CONVEYOR

[72] Inventor: Werner Helmut Rieger, 7084 Unterkochen/Wuerttemberg, Haus Haeselbach, Germany

[22] Filed: Aug. 12, 1969
[21] Appl. No.: 849,390

[52] U.S. Cl. ................................. 198/140, 198/189
[51] Int. Cl. ................................. B65g 17/12
[58] Field of Search ................. 198/129, 151, 140, 148, 193, 198/189, 194, 168, 184

[56] References Cited

UNITED STATES PATENTS 674,382  5/1901  Hoshor ........................... 198/148
1,724,150  8/1929  Webb ............................. 198/189

*Primary Examiner*—Joseph Wegbreit
*Assistant Examiner*—Alfred N. Goodman
*Attorney*—Smythe & Moore

[57] ABSTRACT

A round-steel chain having links in parallel planes and connected by crosspins, the pins having rings which support the chain in the region of driving or supporting sprocket wheels, there being at least four links between every two intermediate rings on crosspins connected to preceding and following crosspins.

7 Claims, 11 Drawing Figures

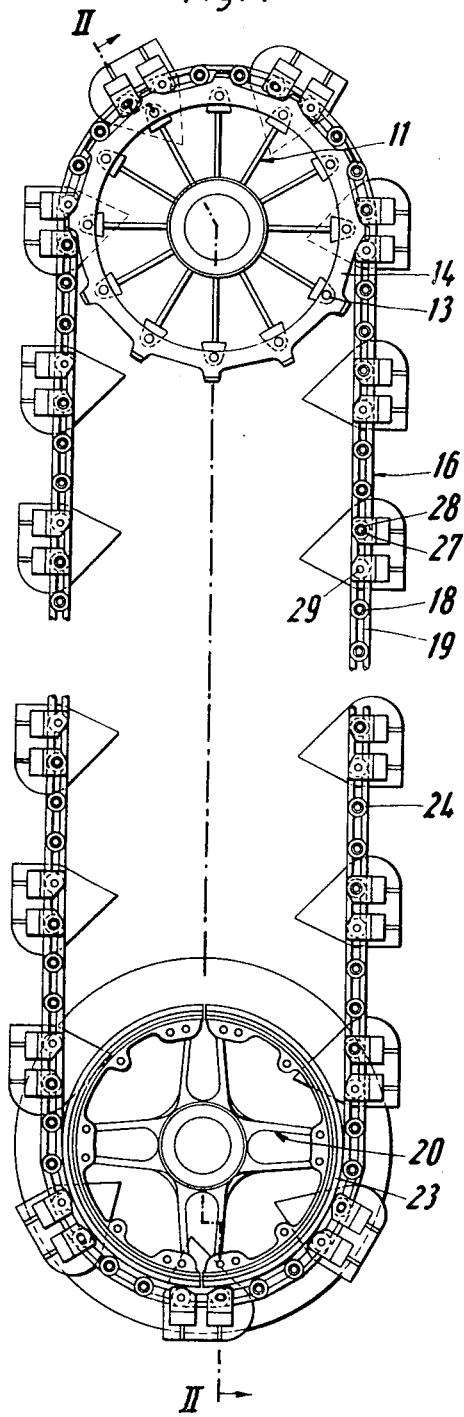
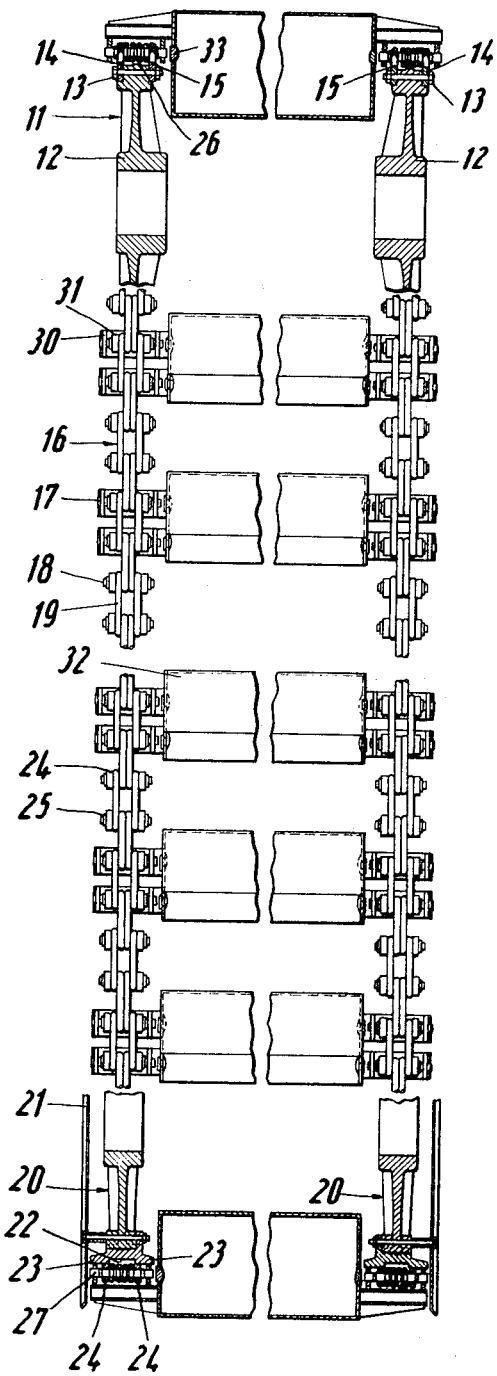

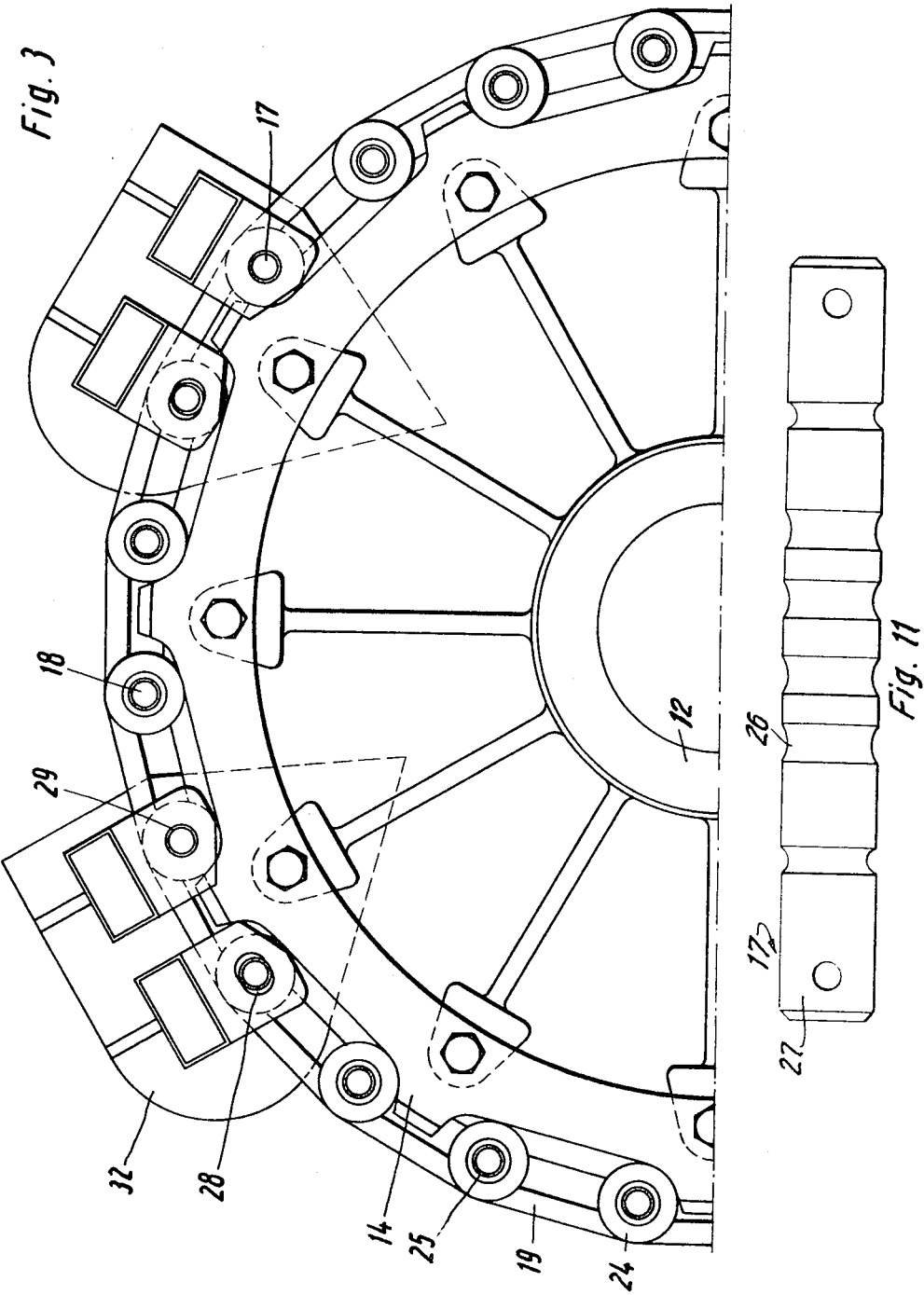

Fig. 4
Fig. 5
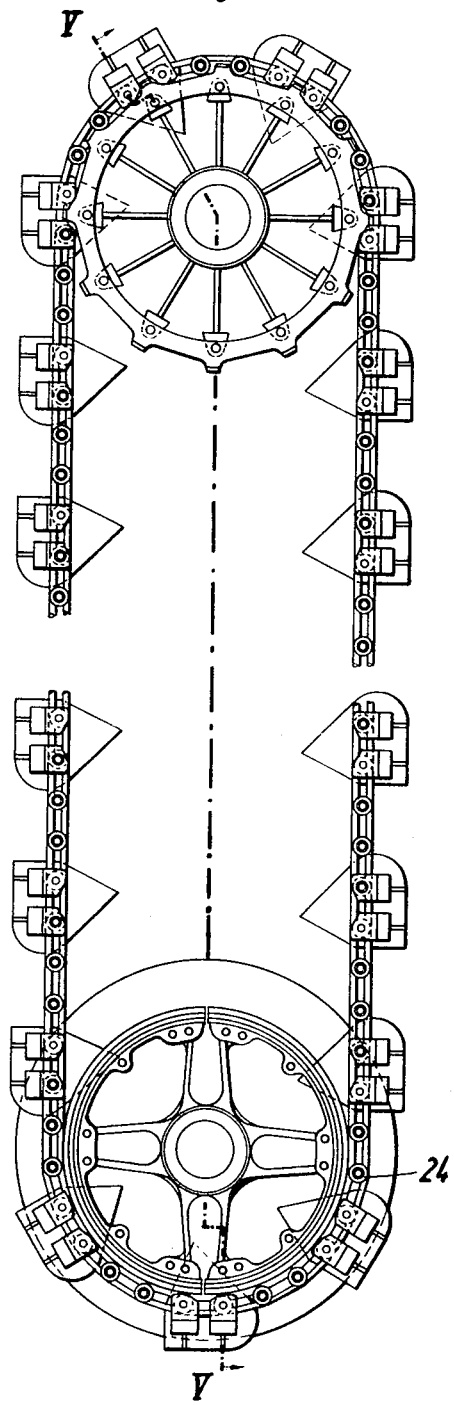
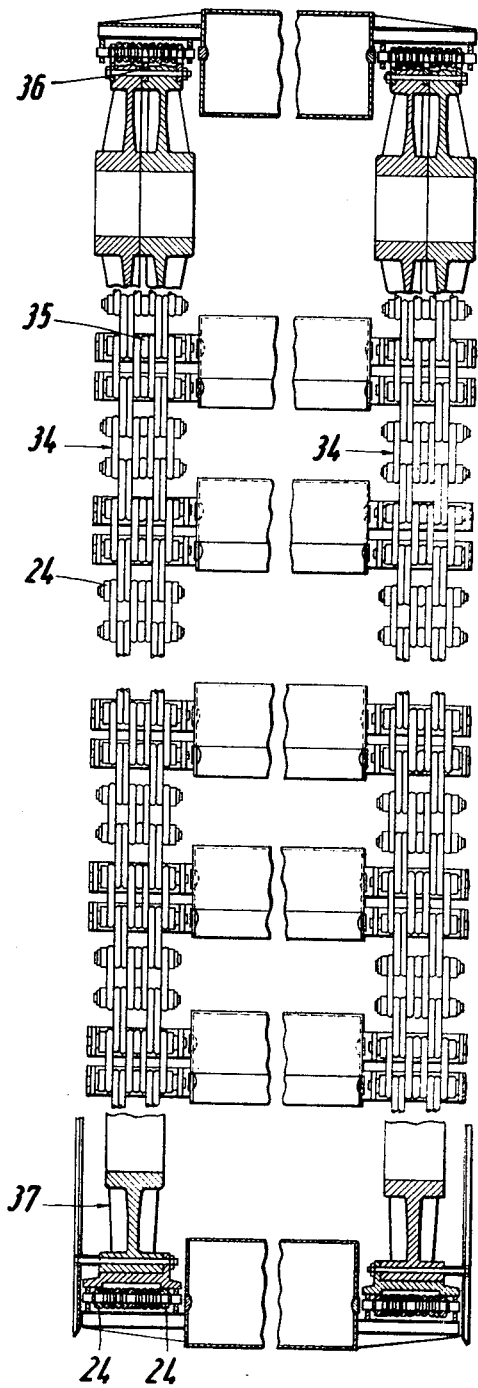
Inventor:
WERNER HELMUT RIEGER
BY
Smythe & Moore
ATTORNEYS

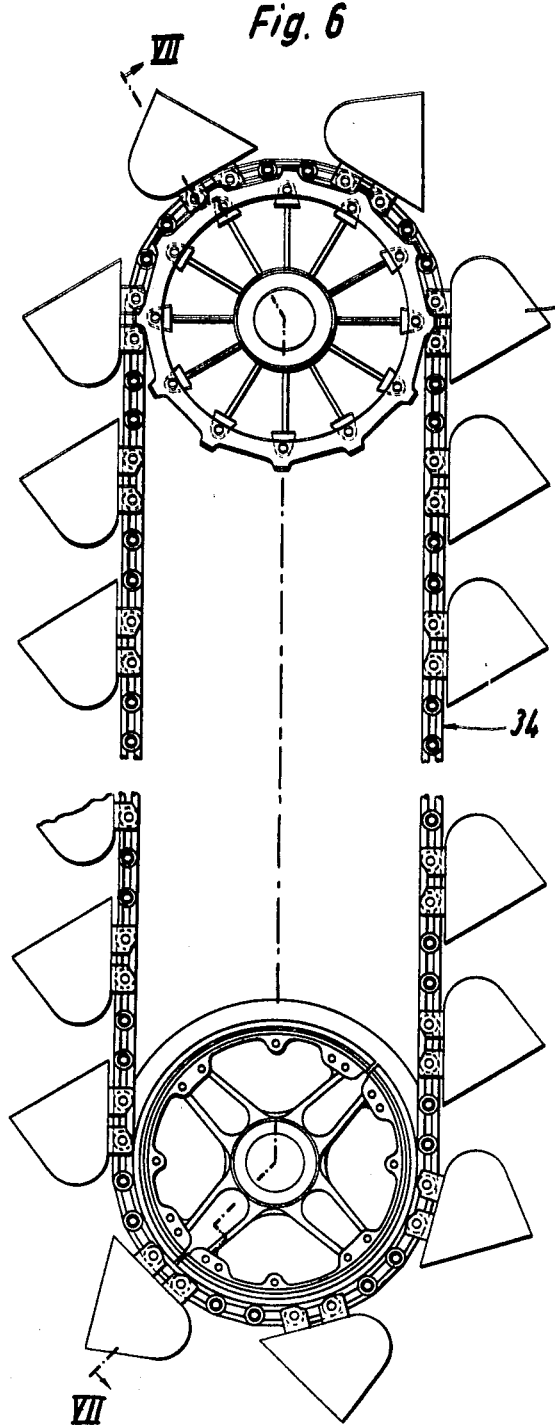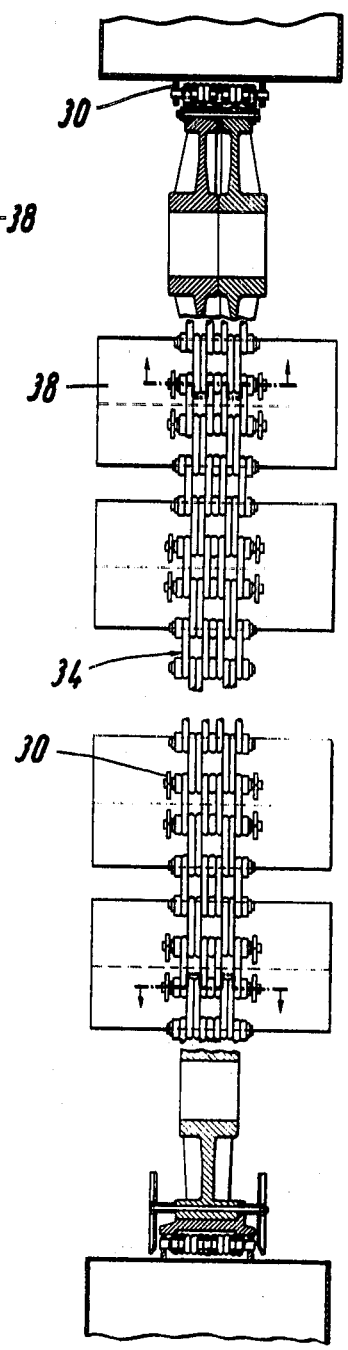

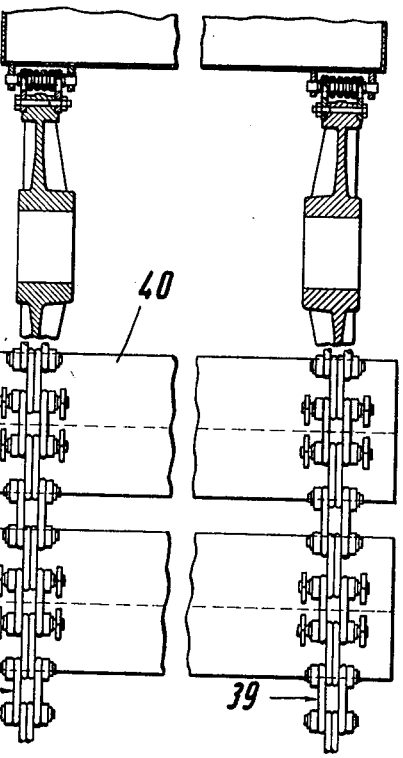
Fig. 9
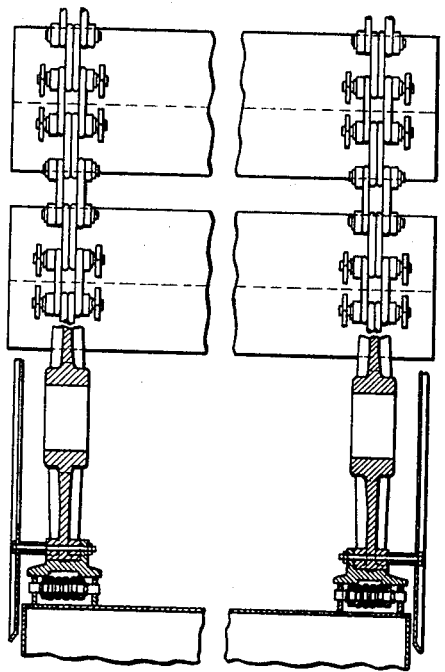
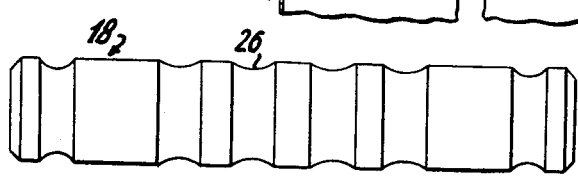
Fig. 10
Inventor:
WERNER HELMUT RIEGER
BY Smythe & Moore
ATTORNEYS

CHAIN CONVEYOR

The present invention relates to a chain conveyor having round-steel chains of elongated links arranged in parallel planes connected together by crosspins which bear at their ends abutments between which there are supported the chain links and intermediate rings which support the chains in the region of the sprocket wheels.

Chain conveyors of the aforementioned type are known in which every chain link engages between two following links, the total cross-section of which is approximately equal to the cross-section of the individual links. The chain links which receive the individual link between them serve in this connection not only for transmitting the pull of the chain but also for the attachment of chain guide crosses and carrying hooks fastened to them (German Pat. No. 1,207,729). The known chain conveyors are developed in all cases as above-floor or below-floor single-chain continuous conveyors and are used for the transportation within the plant of individual parts of different types or for the driving of trucks. Their field of use is therefore very limited and, in particular, they are not suitable for the transportation of loose material.

The object of the present invention is to develop a chain conveyor which permits the transportation of large quantities of loose materials and in which the round-steel pin chains serve for the driving of buckets, scrapers or the like. This purpose is achieved in the manner that in a chain conveyor of the aforementioned type there are provided between every two intermediate rings at least four round-steel chain links connected in pairs with the preceding and following crosspins, at least some of the crosspins having journals for the attachment of buckets, scrapers or the like.

The chain conveyor in accordance with the invention has the advantage over bucket or scraper conveyors of ordinary construction, with simple round-steel chains, that with it, by connecting in parallel sufficiently large number of links, each of which connects two pins together, there can be handled considerable quantities for conveyance without the dimensions of the link having to assume values which place ordinary manufacture, and particularly hardening, in danger. In addition to this, the attachment of the driving elements such as buckets and scrapers to the chains can be simplified by a corresponding shaping of the crosspins and use thereof as plug-type flight attachments. Due to the fact that at least two round-steel links are arranged between every two crosspins, there is finally obtained greater torsional strength of the chain with respect to its axis.

In order to simplify the maintenance of the round-steel chain, it is advisable to give all the links of the chain the same dimensions, i.e., in particular the same rated diameter. For reasons of dependable heat treatment, the latter should not be substantially more than 30 mm.

In order to obtain identical power transmission conditions everywhere, all chain links are in known manner supported in guide grooves on the crosspins.

If particularly large quantities of loose material are to be conveyed and if the center-to-center distances between the sprocket wheels are large, it is advisable to use a chain conveyor in which eight chain links act on each crosspin, said links being subdivided by another intermediate ring into two groups of four chain links each. In this connection, one wheel disc of a chain drive wheel is associated with each series of intermediate rings.

In order to assure quiet operation of the chain conveyor of the invention, the chain pitch and the diameter of the sprocket wheels are so adapted to each other that the deflection of the joint of the links upon travel around the sprocket wheels is less than 15°.

The buckets or scrapers can be fastened both to several lines of chains and to a central chain line. For fastening, there are preferably used web-like flanges provided with bore holes for the ends of the crosspins. These flanges are arranged either on the rear of the buckets, scrapers or the like, or on jibs which are fastened to the sides of buckets or the like held between the chains.

In cases in which the flanges lie to the side of buckets which are to be driven, it is advisable, in order to facilitate mounting, to provide the side walls of the buckets at points opposite the end sides of the crosspins with plug openings which can be closed by plastic mushrooms.

Chain conveyors of the type in question are provided with circular-cylindrical guide wheels. In order to make certain that the links also do not come into contact with them and are subjected here to additional bending stresses, there are used guide wheels which are provided with a circumferential groove arranged in the region of the links and with protruding cylindrical supporting collars which serve to support the chains over the intermediate rings and driving flanges for buckets or scrapers. It goes without saying that the outside diameter of the intermediate rings must be sufficiently large that no contact can take place between the links and the drive sprocket wheels.

The invention will be described in detail below with reference to the illustrative embodiments of the chain conveyor of the invention shown in the drawing in which: FIG. 1 is a side view of a bucket conveyor with buckets arranged between two lines of chain;

FIG. 2 is a section along the line II—II of FIG. 1 in which parts have been omitted;

FIG. 3 is a partial section on a larger scale of the chain drive wheel engaging in a line of chain of the chain conveyor of FIG. 1;

FIG. 4 is a side view corresponding to FIG. 1 of a bucket conveyor with buckets arranged between two double chain strands;

FIG. 5 is a section along the line V—V of FIG. 4 in which parts have been omitted;

FIG. 6 is a side view of a bucket conveyor with buckets suspended from a central chain strand;

FIG. 7 is a section along the line VII—VII of FIG. 6 in which parts have been omitted;

FIG. 9 is a section corresponding to FIG. 7 through a bucket conveyor with suspended buckets shouldered on two chain strands; and FIGS. 10 and 11 are details of the cross pins.

Figure 8:
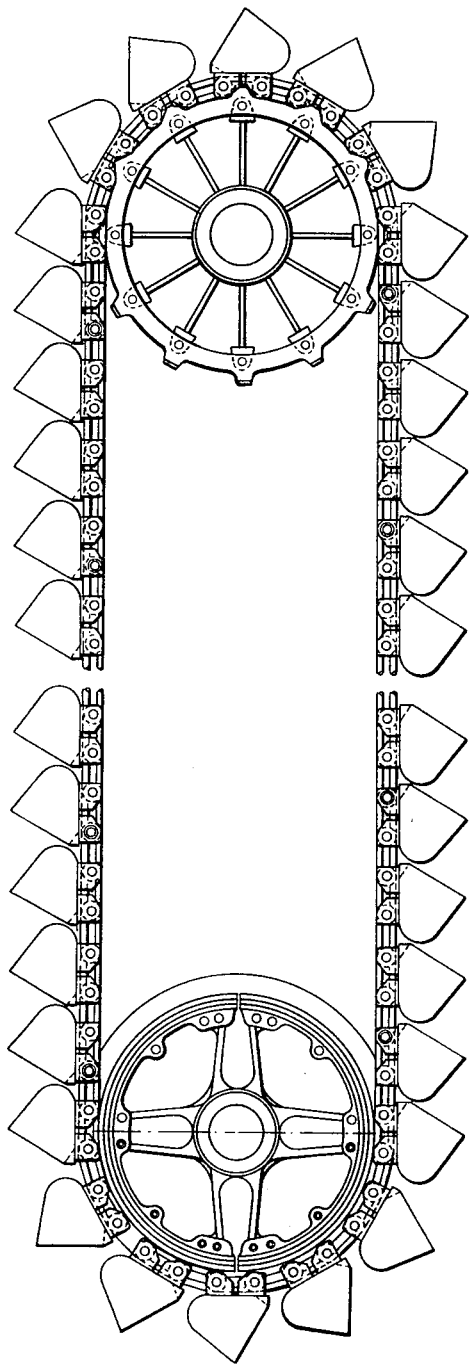
FIG. 8 is a side view of a bucket conveyor of the type shown in FIG. 6 with closer succession of the buckets.

In the case of the chain conveyor shown in FIGS. 1 and 2, there are sprocket wheels 11, each of which consists of a hub 12 and two toothed rims 14, 15 fastened to the hub by bolts 13. Over the sprocket wheels 11, there extend chain strands 16 with elongated round-steel links 19 connected by crosspins 17, 18. On the end of the chain conveyor opposite the sprocket wheels 11, there are two guide wheels 20 on which there are fastened lateral guide discs 21. Each of the guide wheels has, in the region of the chain links 19, a circumferential groove 22 which is defined by supporting collars 23 which serve to support intermediate rings 24 arranged on the crosspins 17, 18 on both sides of the chain links 19. Abutment rings 25, resting on the outside against the intermediate rings 24 and acting as blocking member, hold the intermediate rings 24 in their proper position.

In order furthermore to fix the position of the chain links 19 on the crosspins 17, 18, the latter are provided with guide grooves 26 which in addition improve the conditions of contact between links and crosspins.

The crosspins 17 are longer than the crosspins 18. They form protruding pins 27 which engage in bore holes 28, 29 of web-like flanges 30 which are seated on jib arms 31 which are fastened to buckets 32.

As can be seen, all the links 19 have the same dimensions and the carrying cross-section of the chain strand is the same everywhere. Special chain locks for the chain strands 16 are unnecessary. It is rather possible by removing a corresponding crosspin 17 or 18 to open the chain strands at any desired point. In order to facilitate the attachment and removal of the buckets 32, their side walls are provided with openings into which there extend normally forced-in plastic mushrooms 33. Through these openings, a short, i.e., journal-less, auxiliary pin, used during the the attachment of the buckets whose diameter is preferably somewhat smaller than the nominal diameter of the crosspin to be introduced, can be removed.

FIG. 3 shows that in each case one of the bore holes 28, 29 in the web-like flanges 30 is developed as a slot. Upon increases in the pitch due to wear of the chain, a transmission of tensile force via the bucket suspension is thereby avoided. By this development as a slot, the taking up on the torques introduced into the buckets 32 is in no way impaired.

In FIGS. 4 and 5, there is shown a bucket conveyor having fundamentally the same construction as the bucket conveyor shown in FIG. 1 to 3. In this embodiment, which is also provided with lateral bucket suspension and developed as a slow-mover, the buckets are suspended on two double chains 34 between which additional intermediate rings 35 are arranged which travel over a central gear rim 36 of the double-sprocket wheels which are composed of two single sprocket wheels 11 in accordance with FIGS. 1 to 3. At the guide wheels 37, the chains 34 are supported merely via their outer intermediate rings 24. The intermediate rings 24 and 35 as well as the links have the same dimensions as in the case of the chain conveyor which was first described. The manufacture of chain conveyors of the most different type with the use of standardized parts is thus possible.

In the case of the chain conveyors shown in FIGS. 6 and 7, the buckets 38 are fastened to a single central double chain 34. For this purpose, they bear on their rear wall web-like flanges 30 through which, as in the previously described chain conveyors, crosspins provided with journals extend. In this construction also, recourse can be had extensively to structural parts of the type used in the bucket mechanisms already described. A complete description of the construction is unnecessary in view of the substantial agreement in principle with the bucket mechanisms in accordance with FIGS. 1 to 5. It may merely be mentioned, by way of addition, that due to the width of the chain strands and the guiding of the chain links in grooves which are rolled into the crosspins, tilting of the buckets around an axis extending perpendicular to the plane of the chain is also practically entirely prevented.

While in the case of the bucket mechanisms described up to now, the buckets are in each case flanged onto the chain strands leaving free spaces between, in the case of the construction of FIG. 8, the buckets follow each other directly. Therefore, all the crosspins are developed as bearing pins, i.e., provided with bearing journals.

FIG. 9 finally shows, as further variant, a chain conveyor having two chain strands 39 spaced apart from each other and shouldered buckets 40. This bucket mechanism can also be assembled with extensive use of standardized parts using the "-building block" system.

It should be apparent that variations in details of structure can be made without departing from the spirit of the invention.

What is claimed is:

1. In a chain conveyor the combination comprising of at least one drive wheel sprocket, one guide wheel, and a round-steel chain of elongated links arranged in parallel planes and connected with each other by crosspins with abutments at their ends, said links being supported in guide grooves on said crosspins, and intermediate rings between said abutments and said links for supporting said chain on said sprocket, the outside diameter of said rings being sufficiently large so that no contact occurs between said links and said sprocket, said guide wheel having a circumferential groove defining support collars which bear against said intermediate rings, said chain comprising between every two intermediate rings at least four round-steel links connected in pairs with the preceding and following crosspins, and at least one part of the crosspins having bearing journals for the fastening of buckets, scrapers, or the like.

2. A chain conveyor as claimed in claim 1 wherein all links of the round-steel chain have the same dimensions.

3. A chain conveyor as claimed in claim 1 wherein the diameter of all round-steel links is not substantially greater than 30 mm.

4. A chain conveyor as claimed in claim 1 wherein on each crosspin there act eight links which are subdivided by another intermediate ring into two groups of four links each.

5. A chain conveyor as claimed in claim 1 wherein a wheel disc of a sprocket drive wheel is associated with each row of intermediate rings.

6. A chain conveyor as claimed in claim 1 wherein the chain pitch and the diameter of the sprocket wheels are so adapted to each other that the deflection of the joint of the links upon traveling over the sprocket wheels is less than about 15°.

7. A chain conveyor as claimed in claim 1 wherein tooth engagement takes place only between two crosspins which are connected with each other by outside links.

* * * * *